G. B. SMITH.
BED FABRIC MAKING MACHINE.
APPLICATION FILED OCT. 31, 1912.

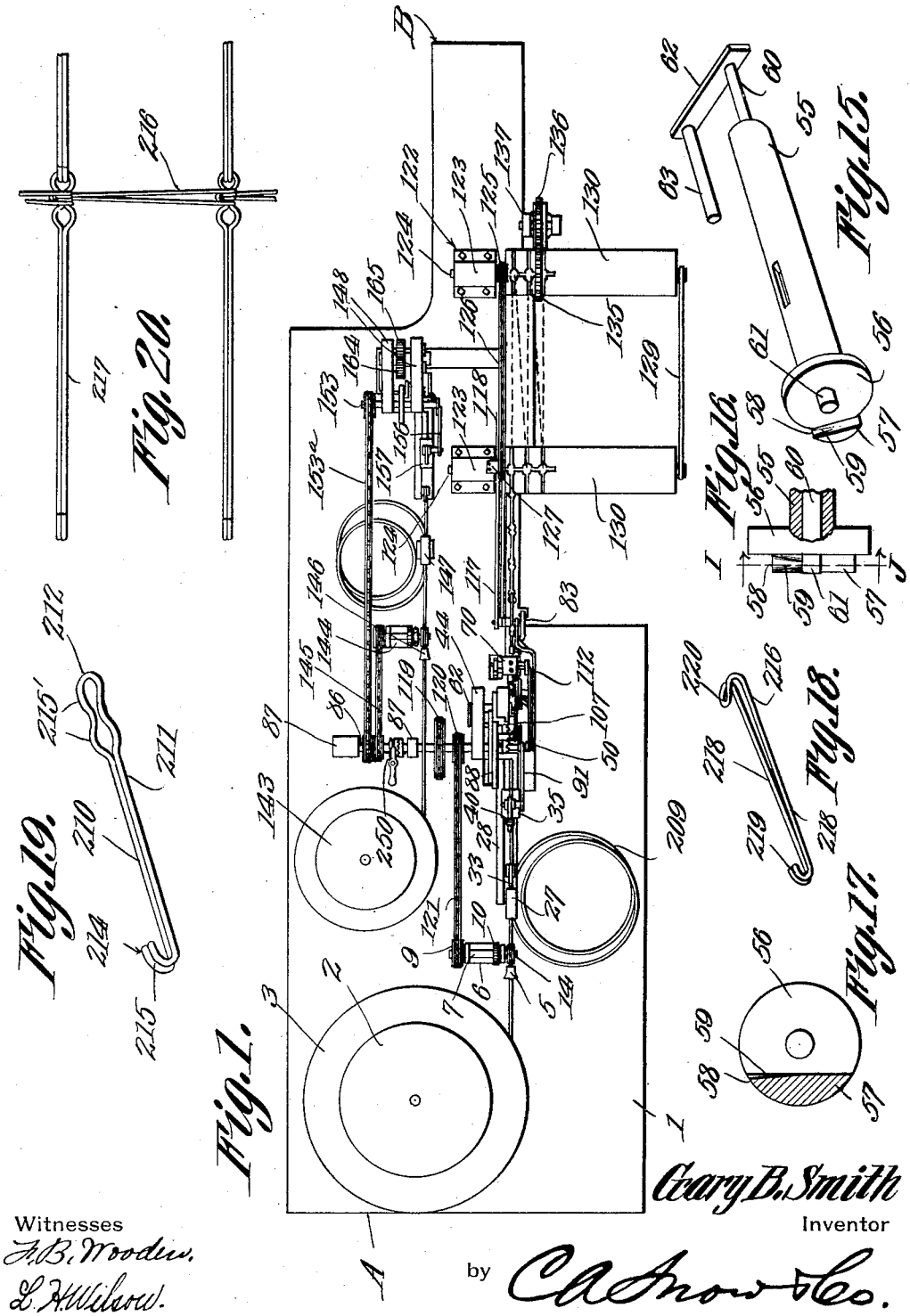

1,114,402.

Patented Oct. 20, 1914.

9 SHEETS—SHEET 2.

G. B. SMITH.
BED FABRIC MAKING MACHINE.
APPLICATION FILED OCT. 31, 1912.
1,114,402.
Patented Oct. 20, 1914.
9 SHEETS—SHEET 3.
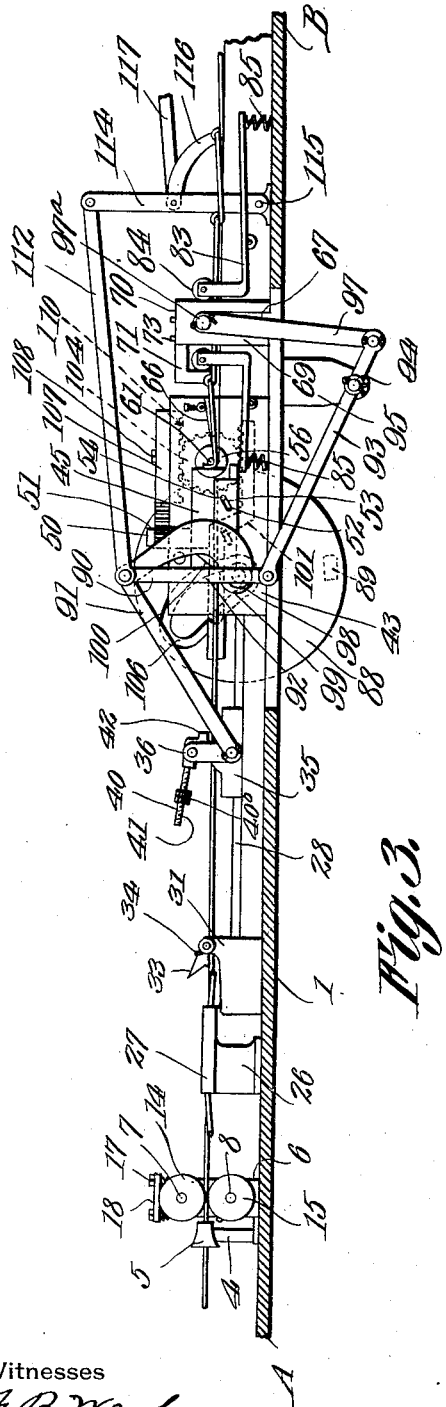
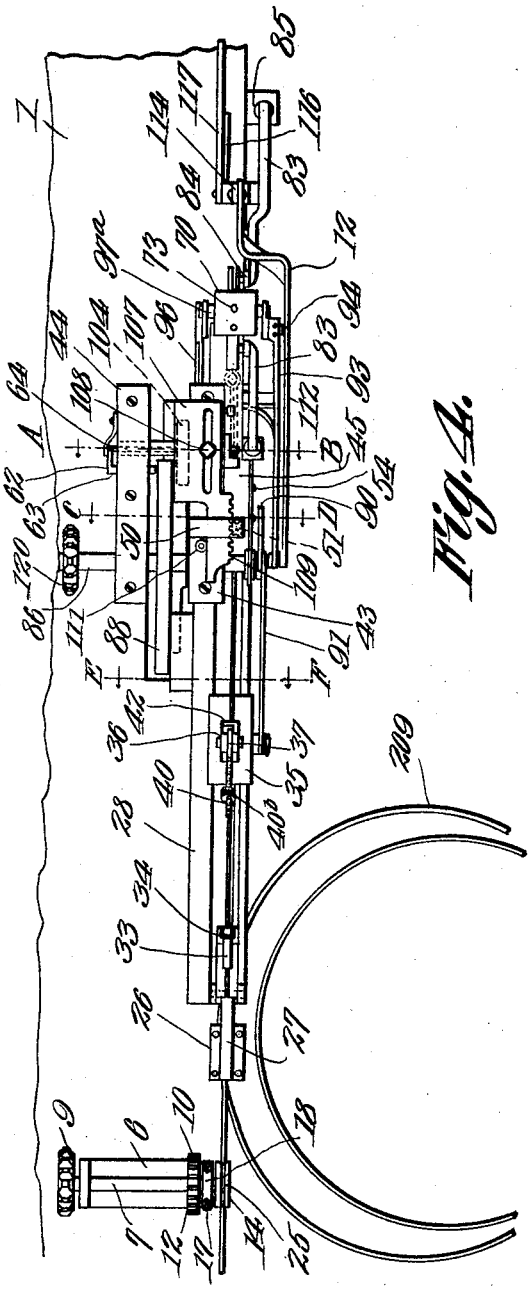
Witnesses
F. B. Wooden
L. H. Wilson
Geary B. Smith Inventor,
by C. A. Snow & Co.
Attorneys.

G. B. SMITH.
BED FABRIC MAKING MACHINE.
APPLICATION FILED OCT. 31, 1912.
1,114,402.
Patented Oct. 20, 1914.
9 SHEETS—SHEET 4.
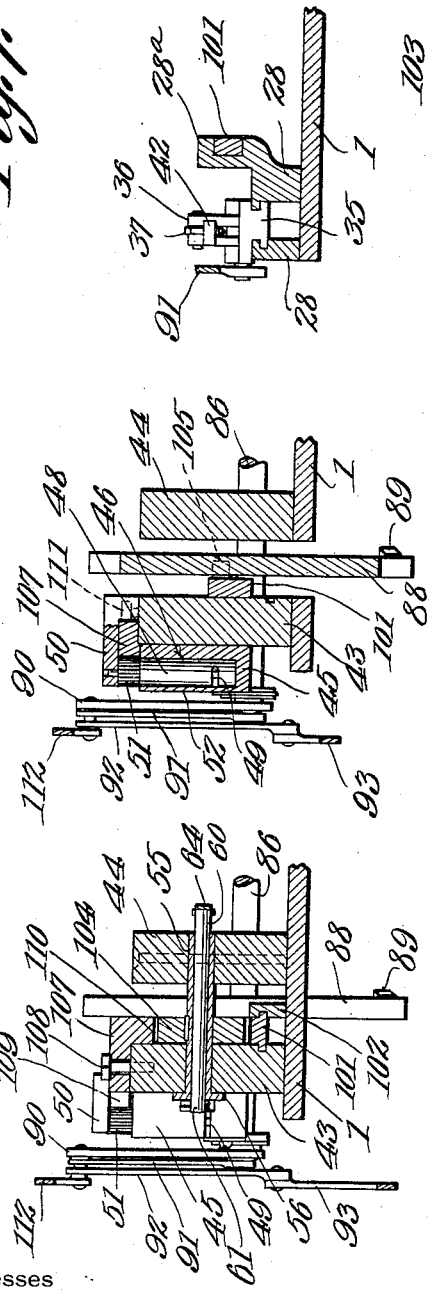
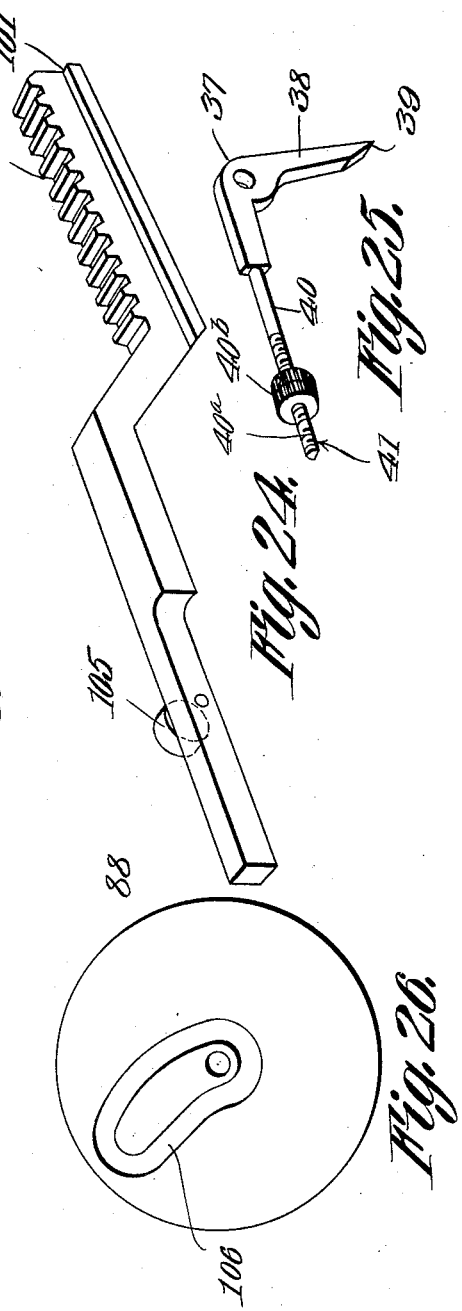
Witnesses
F. B. Wooden
L. H. Wilcow
Gary B. Smith
Inventor,
by C. A. Snow & Co.
Attorneys.

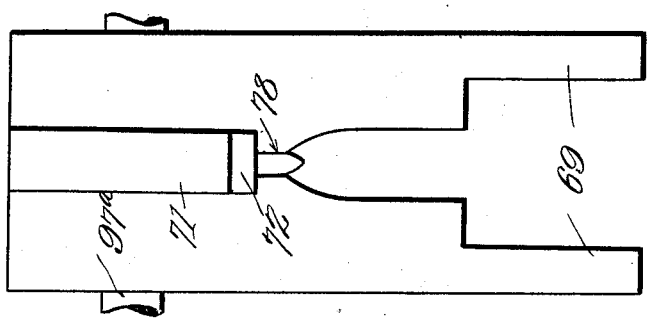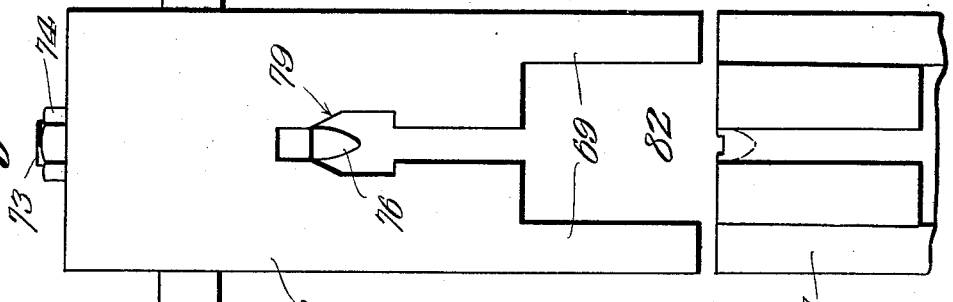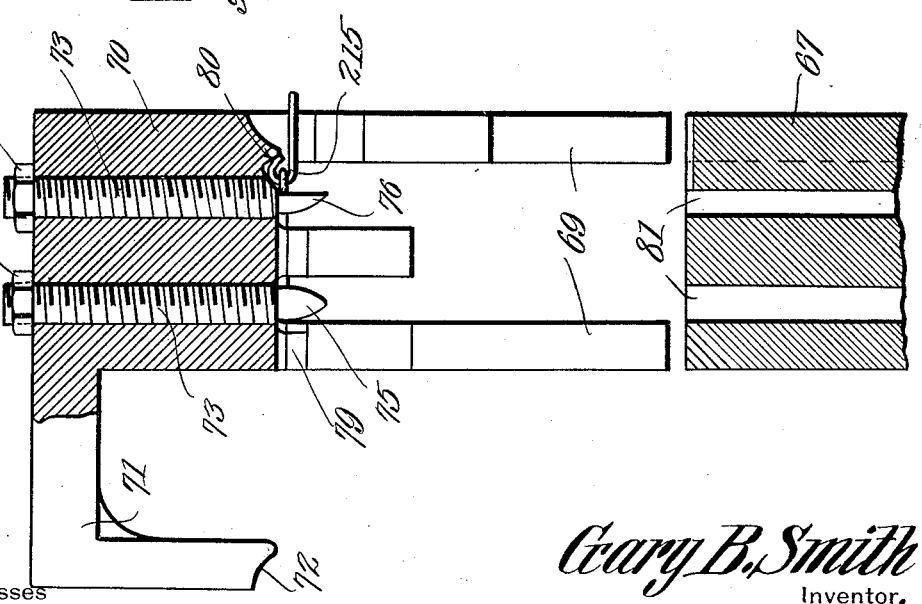

G. B. SMITH.
BED FABRIC MAKING MACHINE.
APPLICATION FILED OCT. 31, 1912.
1,114,402.
Patented Oct. 20, 1914.
9 SHEETS—SHEET 6.
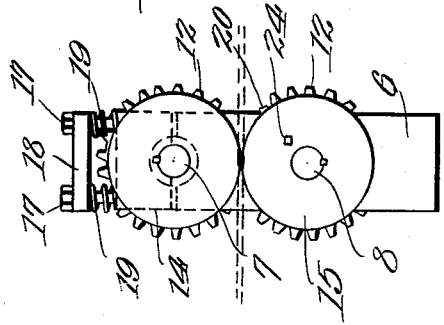
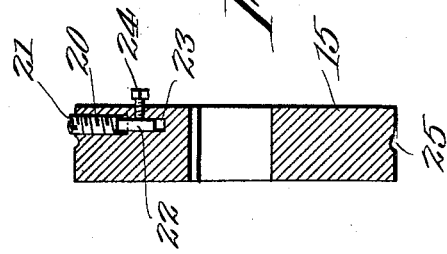
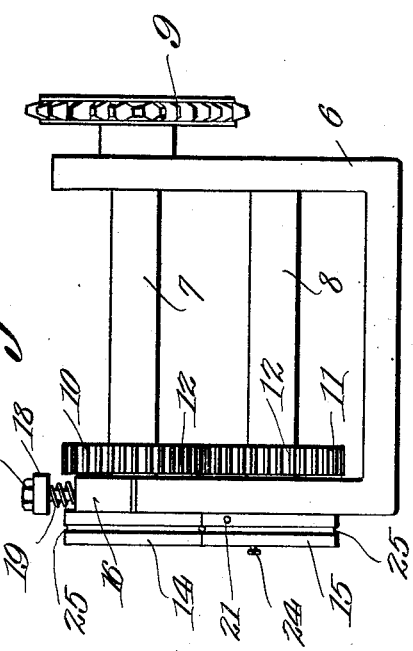
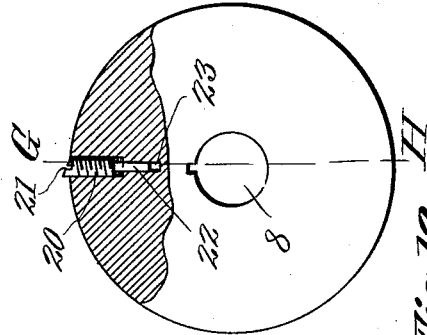
Witnesses
F. B. Wooden
L. H. Wilson
Gary B. Smith
Inventor,
by C. A. Snow & Co.
Attorneys.

G. B. SMITH.
BED FABRIC MAKING MACHINE.
APPLICATION FILED OCT. 31, 1912.
1,114,402.
Patented Oct. 20, 1914.
9 SHEETS—SHEET 7.
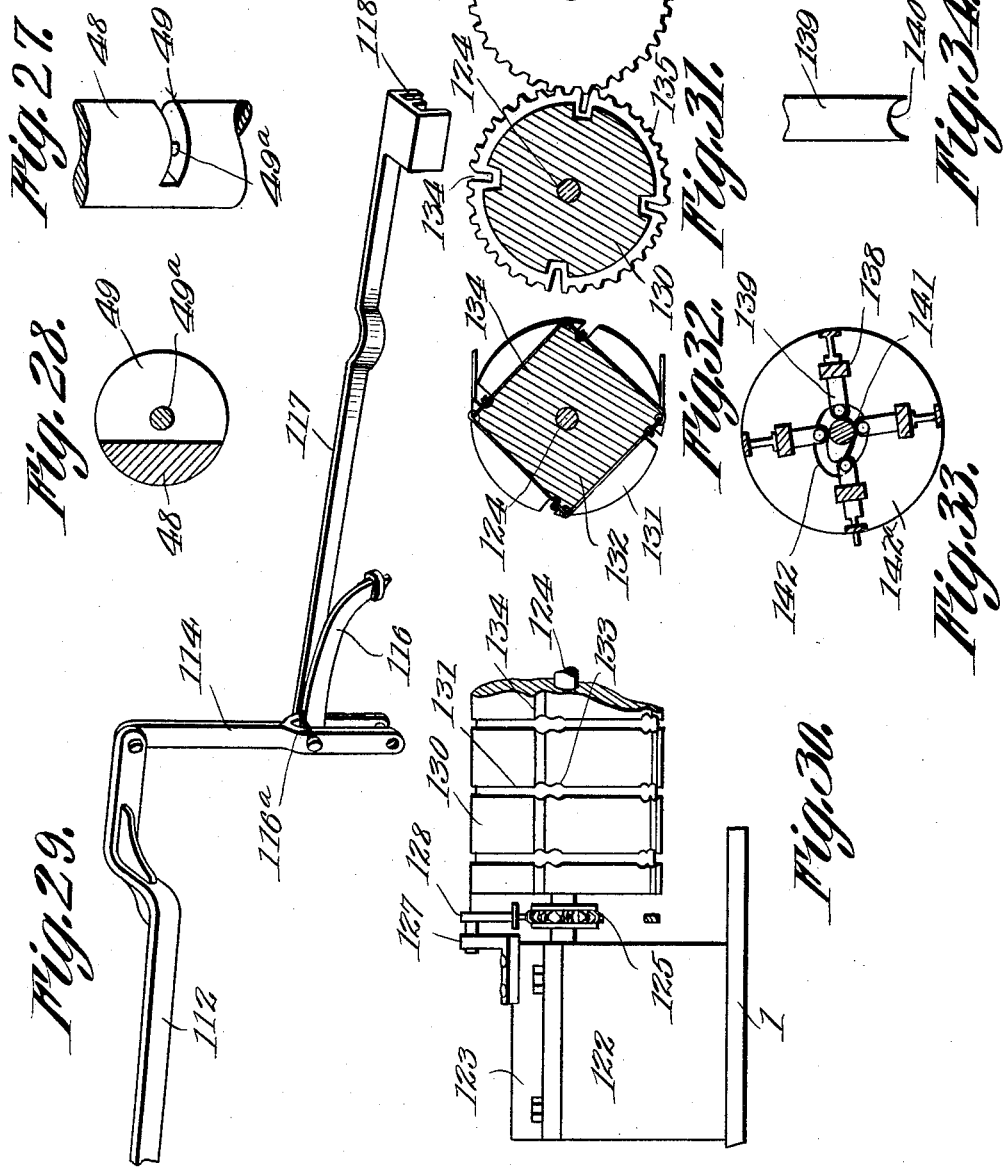
Witnesses
H. B. Wooden
L. H. Wilson.
Gary B. Smith
Inventor,
by C. A. Snow & Co.
Attorneys

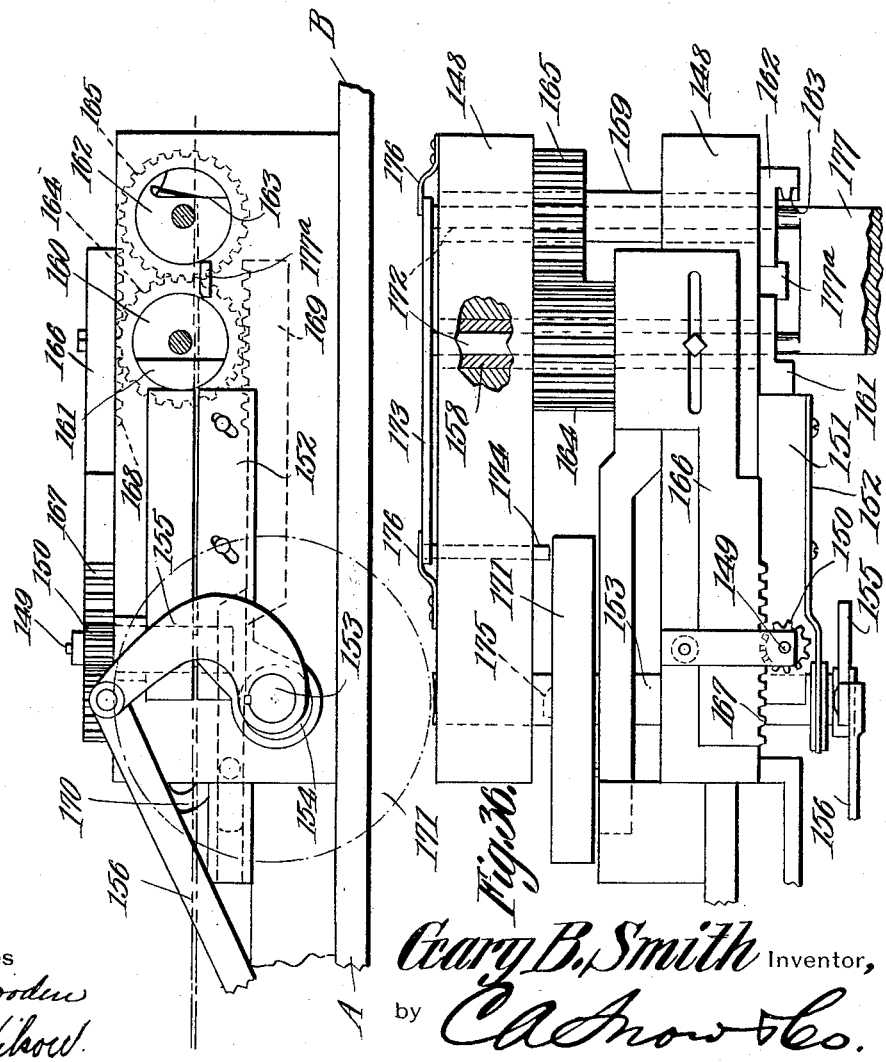

G. B. SMITH.
BED FABRIC MAKING MACHINE.
APPLICATION FILED OCT. 31, 1912.
1,114,402.
Patented Oct. 20, 1914.
9 SHEETS—SHEET 9.
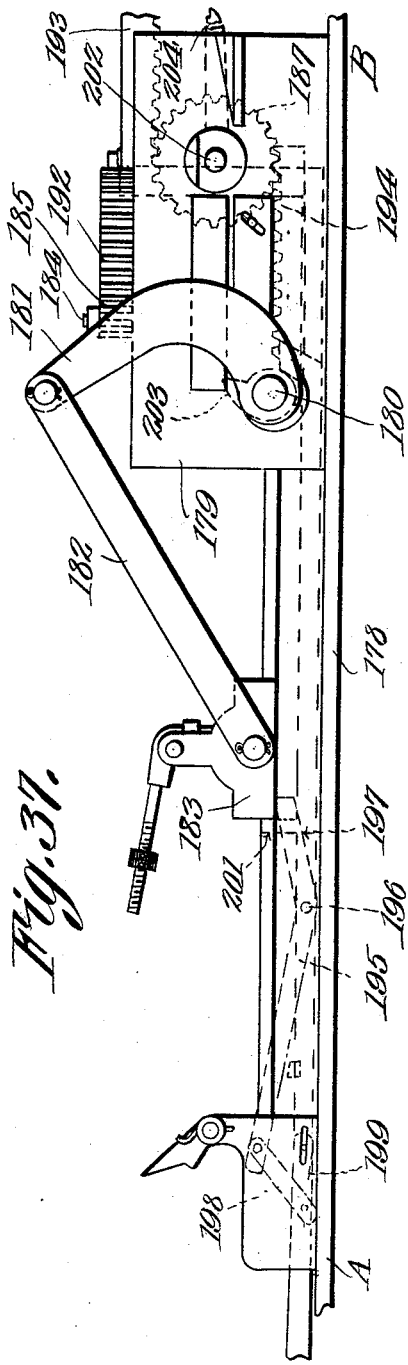
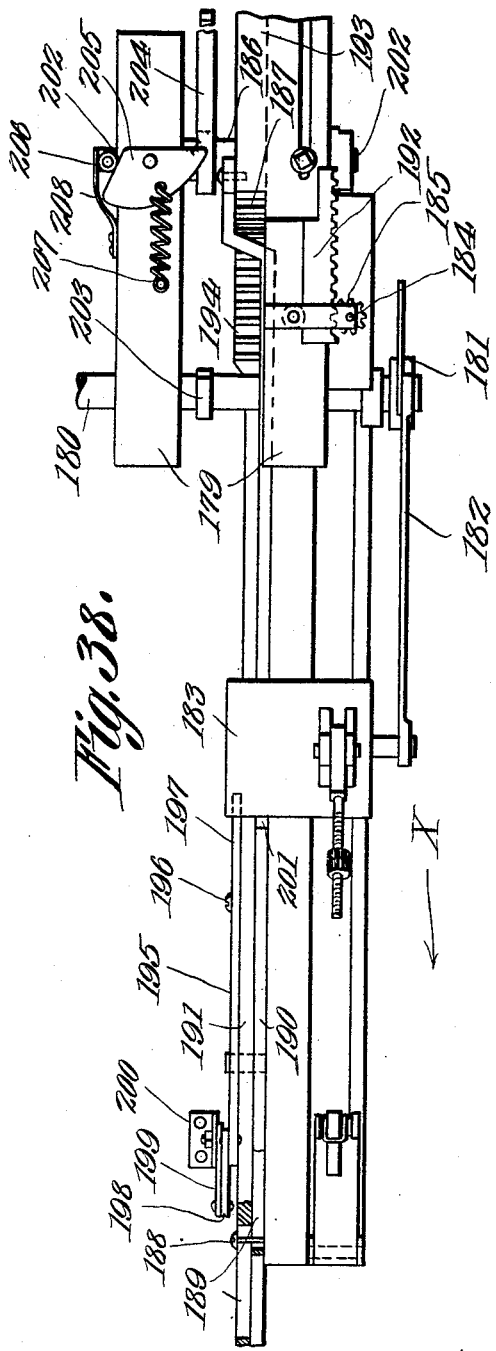
Witnesses
H. B. Worden
L. H. Wilson
Gary B. Smith Inventor.
by C. A. Snow & Co.
Attorneys.

UNITED STATES PATENT OFFICE.

GARY B. SMITH, OF CHICAGO, ILLINOIS.

BED-FABRIC-MAKING MACHINE.

1,114,402.  Specification of Letters Patent.  Patented Oct. 20, 1914.

Application filed October 31, 1912. Serial No. 728,915.

*To all whom it may concern:*

Be it known that I, GARY B. SMITH, a citizen of the United States, residing at Chicago, in the county of Cook and State of Illinois, have invented a new and useful Bed-Fabric-Making Machine, of which the following is a specification.

The device herein disclosed is adapted to be employed for manipulating wires to form links and cross ties of the sort which are employed in the fashioning of spring bed fabrics.

In the machine constituting the subject matter of the present invention, the stock is fed from a reel or the like into the machine, and into a vertically mounted rotatable member which engages the free end of the stock and bends the stock upon itself, thus to form a hook at the end of the stock. A mechanism is provided for cutting off the stock, so that the hook at the end of the stock becomes a U-shaped element, and simultaneously with the cutting operation, the ends of the U-shaped element are turned over to form a pair of hooks at one end of the U-shaped element. The U-shaped element is then subjected to the action of a die and an anvil, whereby spaced eyes are formed in the looped end of the U-shaped element. When the U-shaped element, which has now become a link, is above the anvil, the looped end of another link is engaged with the hooks of the link which is above the anvil, the links being thus concatenated. The hooks of each link are initially bent to engage with the eye of the link which is adjacent the anvil, and subsequently, the hooks are given a final set. A similar mechanism is provided for fashioning a cross tie, the stock being bent into U-shape and being trimmed off. The free ends of the cross tie are bent to form hooks and the looped end of the cross tie is bent to form another hook. The concatenated links from the link forming mechanism pass in the form of a chain, to an assembling mechanism, preferably taking the form of a pair of rollers, about which the chain is wound, in spaced convolutions. The cross ties are removed from the tie forming machine, and are engaged with the chain of links when the same is wound about the rollers. The cross ties ultimately traverse the periphery of one roller, and as the cross ties move across the periphery of this roller, a mechanism operates to set the hooks of the cross ties upon the links of the chain.

The invention aims to provide a means whereby the operations above described, and the several steps thereof may be carried out, and to improve generally, devices of that type to which the present invention appertains.

Broadly considered, the invention aims to provide novel means for shaping the stock to form the links and the cross ties, to provide novel actuating mechanism, and to provide means whereby the cross ties and the links may be assembled to form the completed fabric.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 shows the invention in top plan; Fig. 2 is a side elevation; Fig. 3 is a side elevation of the link forming mechanism and of the feeding mechanism which is assembled therewith; Fig. 4 is a top plan of the structure shown in Fig. 3; Fig. 5 is a transverse section on the line A—B of Fig. 4; Fig. 6 is a transverse section on the line C—D of Fig. 4; Fig. 7 is a transverse section on the line E—F of Fig. 4; Fig. 8 is a side elevation of the die and the anvil, parts being sectioned; Fig. 9 is a side elevation of the die and of the anvil, the view point in Fig. 9 being at right angles to the view point in Fig. 8; Fig. 10 is a side elevation of the die, the view depicting the opposite face from that shown in Fig. 9; Fig. 11 is a side elevation of the tension means; Fig. 12 is an end elevation of the tension means; Fig. 13 is a side elevation of one roller of the tension means, parts being sectioned; Fig. 14 is a section on the line G—H of Fig. 13; Fig. 15 is a perspective showing that portion of the mechanism whereby the stock is severed to form the links, and whereby the free ends of the links are bent to form the hooks of the links; Fig. 16 is a fragmental side elevation of the structure shown in Fig. 15, parts being sectioned; Fig. 17 is a section on the line I—J of Fig. 16; Fig. 18 is a perspective of the cross tie; Fig. 19 is a perspective of the link; Fig. 20 is a plan of the completed fabric, comprising elements shown in Figs. 18 and 19; Fig. 21 is a plan of the die; Fig. 22 is a plan of the anvil; Fig. 23 is a perspective of an element which serves to elevate the link as the same is advanced, so that the eye at the end of one link may be elevated for engagement with the hooks at the opposite end of an adjoining link; Fig. 24 is a perspective of the rack bar whereby movement is transmitted to the loop forming member; Fig. 25 is a perspective of the wire grip which engages the stock to advance the same; Fig. 26 is a side elevation of the actuating disk, the view depicting the means whereby motion is transmitted to the rack bar, shown in Fig. 24; Fig. 27 is a fragmental perspective of the bending shaft; Fig. 28 is a transverse section of the bending shaft; Fig. 29 is a perspective of a portion of the mechanism whereby motion is transmitted to the assembling rollers and to the chain of links which is carried by the assembling rollers; Fig. 30 is a fragmental side elevation of one of the assembling rollers, together with the means whereby the roller is supported for rotation; Fig. 31 is a sectional detail showing a portion of the mechanism whereby the cross ties are clinched into the concatenated links; Fig. 32 is a transverse section of one of the assembling rollers; Fig. 33 is an elevation showing the means whereby the clinching members which operate to secure the cross ties in the links, are actuated; Fig. 34 is a side elevation of one of the clinching members shown in Fig. 33; Fig. 35 is a side elevation of the mechanism whereby the cross ties are formed; Fig. 36 is a plan of the structure appearing in Fig. 35; Fig. 37 is a side elevation showing a modified mechanism for actuating the cutting and loop forming means; and Fig. 38 is a plan of the structure shown in Fig. 37, parts being broken away.

For convenience in description, that end of the machine to which the reference character A is applied will be considered the forward end of the machine, the rear end of the machine being designated by the letter B.

The machine herein disclosed comprises a feeding mechanism, a link forming mechanism, an assembling mechanism, and a tie forming mechanism. These several constituent parts will be described in the order set forth.

In carrying out the invention and referring particularly to Figs. 1 and 2, there is provided a suitable base 1 upon which is journaled for rotation, a horizontally disposed stock reel, indicated at 2, the stock reel being provided adjacent its lower end with a supporting flange 3, the material in the form of a roll being placed about the reel 2 so as to rest upon the supporting flange 3. Located in front of the stock reel 2 is a standard 4, supporting a thimble 5, through which the stock passes.

A tension device, constituting a part of the feeding mechanism, is provided, the tension device being shown in detail in Figs. 11, 12, 13 and 14, reference being had to Figs. 1 and 2. The tension mechanism includes a frame 6 in which is journaled for rotation, shafts 7 and 8, one shaft 7 being provided at one end with a sprocket wheel 9. A pinion 10 is secured to the shaft 7, the pinion 10 meshing into a pinion 11 which is secured to the shaft 8. The pinions 10 and 11 are peripherally toothed, as indicated at 12. Secured to the shaft 7 is a roller 14, engaging the periphery of a roller 15 which is secured to the shaft 8. The shaft 7 is carried at one end, and adjacent the roller 14, in a vertically movable bearing 16 which is mounted to slide upon standards 17 which are connected with one end of the frame 6. The standards 17 are connected at their upper ends by a cap 18, and compression springs 19 surround the standards 17 and bear at their opposite ends against the cap 18 and against the bearing 16, to the end that, when the bearing 16 is elevated by a mechanism to be described hereinafter, the bearing may be depressed automatically. A screw 20 is threaded into the periphery of the roller 15, the exposed end face of the screw 20 being beveled as indicated at 21, for engagement with the roller 14, so as to elevate the roller 14 and to put the springs 19 under compression. The screw 20 terminates in a shank 22 received in a recess 23 in the roller 15, there being a set screw 24 threaded in the side face of the roller 15 and engaging the shank 22, to hold the screw 20 against rotation, it being obvious that by adjusting the screw 20 in the roller 15, the rollers 14 and 15 may be separated to a greater or less extent. The peripheries of the rollers 14 and 15 are equipped with coöperating grooves 25 which receive the stock.

Located in front of the tension mechanism above described is the pedestal 26 which supports an eye 27, the eye 27 receiving the stock and having functions which will be set forth hereinafter. Located in front of the pedestal 26 and the eye 27, is a support 31. A trip 33 is pivotally mounted in the support 31, which is vertically adjustable by means of the side screws 32, one of which appears in Fig. 3 and is depressed by a spring 34 (see Fig. 3) which is secured to the support 31 and bears upon the trip. The trip 33 coöperates with a mechanism hereinafter described, for engaging and advancing the stock.

Passing now to a description of the link forming mechanism, it will be observed that guides 28 are secured to the base 1, adjacent and in front of the support 31. Mounted to slide in the guides 28 is a cross head 35 having an upright extension 36 in which is pivoted an angular grip 37, shown in detail in Fig. 25. One arm 38 of the grip 37 is provided at its end with a sharpened edge 39 which engages the stock to advance the same, when the cross head 35 is slid rearwardly upon the guides 28. The other arm 40 of the grip 37 is flattened on its lower edge as at 41, and is threaded at 40ᵃ to receive abutting nuts 40ᵇ, which may be milled and provided with spanner openings. The nuts are adjustable on the arm 40 and are adapted to engage with the free end of the trip 33, the adjustment of the nuts serving to regulate, to a fine degree, the length of stock which is cut off. The nuts 40ᵇ, engage the free end of the trip 33, thereby tilting the grip 37 upon its fulcrum and causing the portion 39 of the grip to engage with the material, whereupon when the cross head 35 is slid rearwardly, the stock will be advanced. The extension 36 of the cross head 35 is provided with a transversely disposed stop arm 42 which engages the portion 38 of the grip 37, to prevent an undue swinging movement of the grip.

Held by the base 1 is a pair of blocks 43—44 extending from the front of the machine toward the rear end thereof. To the side face of the block 43 is secured a support 45, in the forward end of which is fashioned a vertical bearing 46, communicating with a horizontally disposed slot 47 formed in the side face of the support. Journaled for rotation in the bearing 46 is a bending shaft 48, shown in detail in Figs. 27 and 28. The bending shaft 48 is provided with a transverse slot 49, across which extends a pin 49ᵃ. The upper end of the bending shaft 48 is journaled in a hood 50, supported by the block 43. The upper end of the bending shaft 48 is provided with a horizontally disposed pinion 51. A cover plate 52 is mounted upon the outer face of the support 45 for vertical sliding movement, and at this point it may be stated that the construction of the cover plate 52 will be understood best when Fig. 35 is examined, although this figure shows a portion of the structure which is distinct from the link forming mechanism, attention being directed, in Fig. 35, to the element 152. The cover plate 52 is provided with diagonal slots 53, receiving pins 54 which are mounted in the outer side face of the support 45, the construction being such that when longitudinal movement is imparted to the cover plate 52, the same will recede and will uncover the slot 47 in the support 45.

Referring to Fig. 15 and comparing the same with Fig. 5, it will be observed that a tubular shaft 55 is journaled for rotation in the blocks 43 and 44, the shaft 55 having at one end a head 56 provided with a cutting lug 57, the operating edge of which is indicated at 58. Adjacent the edge 58, the cutting lug 57 is provided with a slant-face 59 which slopes toward the head 56.

Mounted to reciprocate in the tubular shaft 55, transversely of the machine, is a slidable member 60, one end of which, denoted by the numeral 61, protrudes beyond the end face of the head 56. Secured to the opposite end of the slidable member 60 is a head 62 which extends longitudinally of the machine, the head 62 carrying a finger 63, disposed parallel to the slidable member 60, the finger 63 being mounted to slide in the block 44, transversely thereof. One or more springs 64, carried by the block 44, rest against the head 62 and serve to hold the end 61 of the slidable member 60 projected beyond the end face of the head 56, as shown in Fig. 15.

Located in the rear of the shaft 55 and attendant parts, and supported in any suitable manner upon the base 1, is a plate 65, shown in clearest detail in Fig. 23, the plate 65 being provided upon its upper face with a rib 66, the upper edge of which slopes downwardly and forwardly. Located to the rear of the plate 65 is an anvil 67 having openings 68 receiving the legs 69 of a vertically movable die 70, the die 70 having a forwardly extended, angularly disposed arm 71, the lower end face of which is curved downwardly and rearwardly, as indicated at 72. Threaded into the top of the die 70 are screws 73 held in place by lock-nuts 74, one of the screws 73 terminating in a conical prong 75, the other of the screws 73 terminating in a semi-conical prong 76, the rear face of the prong 76 being cut away in a straight line, as will be understood best when Fig. 8 is examined. The prongs 75 and 76 project into recesses 77 formed in the under face of the die (see Fig. 21), the recesses 77 being connected by channels 78. Upon both sides of the channels 78, the die is provided with downwardly diverging walls 79. Referring to Fig. 8 it will be seen that in the lower face of the die 70, to the rear of the prong 76 there is fashioned an upwardly and forwardly inclined shoulder 80. Noting Fig. 22 it will be observed that the anvil 67 is provided in its upper face with openings 81 which receive the prongs 75 and 76, there being a rearwardly extending channel 82 in the upper face of the die, the channel 82 communicating with one of the openings 81.

Referring particularly to Fig. 3, it will be observed that levers 83 extend longitudinally of the machine, upon opposite sides of the die and the anvil, the levers being pivotally supported intermediate of their ends, the adjacent ends of the levers being vertically disposed and carrying rollers 84, located, respectively, in front of and to the rear of the anvil 67. Compression springs 85 bear upon the base 1 and thrust upwardly against the remote ends of the levers 83, the rollers 84 being thereby depressed, so as to hold the material upon the anvil 67, when the die 70 is elevated.

Before describing the driving mechanism whereby motion is imparted to the several elements hereinbefore set forth, the path of the material through the link forming mechanism will be traced, and subsequently the driving mechanism will be set forth in detail. The stock, in the form of a roll of wire, is placed upon the reel 2, and thence, the free end of the stock is led through the thimble 5 and through the eye 27, the stock being looped through the eye 27 to form a plurality of expansion coils 209, one of which, preferably, is engaged in the eye 27. That portion of the stock which lies between the eye 27 and the thimble 5 is engaged in the grooves 25 of the rollers 15 and 14 of the tension mechanism. To the rear of the eye 27, the stock is engaged by the member 39 of the arm 38 of the grip 37 which is carried by the cross head 35. At this point it may be stated that when the teeth 12 of the pinions 10 and 11 of the tension mechanism are in mesh, the stock will be fed off of the stock reel 2 and into the expansion coils 209. When, however, the teeth 12 are out of mesh, and when the projecting screw 20 which is carried by the roller 15 engages the roller 14, the rollers 14 and 15 will be spaced apart vertically, the bearing 16 upon the shaft 7 rising, so that the material will thus be fed intermittently into the expansion coils 209. As has been set forth hereinbefore, when the cross head 35 moves forwardly, the trip 33 will engage with the angular grip 37 and cause the same to engage with the stock, so that when the cross head 35 moves forwardly, the stock will be advanced out of the expansion coils 209 and into the link-forming machine. The free end of the stock passes through the slot 49 in the bending shaft 48, between the pin 49$^a$ and the rear wall of the slot 49. When rotary movement is imparted to the bending shaft 48, the free end of the stock will be swung forwardly, the stock being thus bent around the pin 49$^a$. During this operation, the cover plate 52 will be retracted, so that the free, forwardly extended end of the stock may pass outwardly through the slot 47 in the support 45. At this point, Fig. 19 may be examined with profit, it being understood that, the arm 210 of the link extends in a continuous length forwardly to the stock reel 2, and that the arm of the link represents the free end of the stock which has been bent forwardly, around the pin 49$^a$ of the bending shaft 48, the bend 212 of the link being formed around the pin 49$^a$. Due to the rearward movement of the cross head 35, the stock with the arm 211 bent therein, is move rearwardly, the looped end of the stock passing between the projecting end 61 of the slidable member 60 and the cutting lug 57 of the head 56 which is carried by the tubular shaft 55. When the shaft 55 is rotated, the cutting edge 58 of the lug 57 will sever the stock, at the point indicated by the reference character 214 in Fig. 19. At the same time, the lug 57 will engage the free ends of the link, and bend them to form the hooks 215. While the hooks 215 are being bent, they will be crowded transversely by the slant-face 59 of the cutting lug, the hooks being thus forced together. At this point, the description of the travel of the links through the machine will be temporarily suspended. However, let it be supposed that another link, completed so far as hereinbefore described, has been placed between the die 70 and the anvil 67. When the die descends, the diverging walls 79 of the die will engage the arms 210 and 211 of the link and force them into the channels 78, the arms 210 and 211 being forced into intimate contact, and the prongs 75 and 76 entering the looped end of the link, so as to fashion a pair of eyes 215'. When the die 70 is elevated off of the anvil 67, the completed link will be held upon the anvil by the rollers 84 which are carried by the spring-constrained levers 83.

When the stock is advanced by the action of the cross head 35, and after the bend 212 has been formed in the link, but before the stock has been cut off at 214, and before the hooks 215 have been fashioned, the bend 212 of the link will ride along the upper edge of the rib 66 which is carried by the plate 65. The bend 212 will thus be elevated so that the same will engage over the hooks 215 of the link which is already held between the die 70 and by the anvil 67, which link, as hereinbefore explained, is held upon the anvil 67 by the action of the spring constrained levers 83. Thus, when the completed link which is between the die 70 and the anvil 67, is advanced, in a manner to be set forth hereinafter, the partially completed link which is engaged by the hooks 215 of the completed link, will be drawn between the die and the anvil, whereupon, when the die descends, the eyes 215' will be fashioned in the link, and the arms 210 and 211 will be forced together in the manner hereinbefore set forth. When the die 70 descends to complete one link, the inclined face 72 of the forwardly extended arm 71 of the die will engage with the hooks 215 of the link which is held upon the anvil 67, and bend the same initially to engage with the eye 212 of the partially completed link, thereby preventing the separation of the links, before the partially completed link is drawn between the anvil and the die. Noting Fig. 8 it will be seen that when the die 70 descends, the inclined shoulder 80 of the die will engage with the hooks 215 and give the same a final set into the eye 212. By the operation above described, the links are completed, and are connected with each other, in the form of a chain.

A description will now be given of the driving mechanism whereby movement is imparted to the several elements hereinbefore set forth. Disposed transversely of the machine and journaled for rotation in the blocks 43 and 44, and in bearings 87 which are upheld by the base 1 is a drive shaft 86. Secured to the drive shaft 86 and located between the blocks 43 and 44 is a disk which is denoted by the numeral 88. Upon one side, the disk 88 is equipped with a cam 89. This cam 89 is adapted to engage the free end of the finger 63, thereby retracting the slidable member 60 in the shaft 55 and withdrawing the protruding end 61 of the member 60, so that the hooks 215 which have been fashioned in the link may be drawn through the machine. The slidable member 60 is advanced by the action of the spring 64, so that the end 61 of the member 60 projects beyond the end face of the head 56 of the shaft 55. Secured to the drive shaft 86 is a crank arm 90, a pitman 91 being connected with the crank arm and with the cross head 35, thereby to impart reciprocatory motion to the cross head when the shaft 86 is rotated. Pivoted to the crank arm 90 is a link 92, which in its turn, is pivotally connected with a lever 93 fulcrumed intermediate its ends as indicated at 94 upon a support 95 which depends from the base 1. The lever 93 is equipped at one side with a lateral extension 96, the extremity of the extension 96 and the rear extremity of the lever 93 lying upon opposite sides of the anvil 67. Pivotally connected with the rear end of the lever 93 and with the extension 96 thereof are links 97, the upper ends of which are connected with a shaft 97ᵃ which extends through the die 70.

From the foregoing it will be seen that when the shaft 86 is rotated, actuating the crank arm 90, the crank arm 90 will actuate the link 92, the same tilting the lever 93, the links 97 causing a vertical movement of the die 70 upon the anvil 67. In order to retract the closure plate 52 which extends across the slot 47 in the support 45, an eccentric 98 is secured to the shaft 86 or to the disk 87, the eccentric engaging a strap 99 constituting a part of an extension 100 of the closure or cover plate 52. It will thus be seen that when the shaft 86 is rotated, longitudinal sliding movement will be imparted to the plate 52, the diagonal slots 53 coöperating with the pins 54 to raise and lower the plate, to the end that the slot 47 in the support 45 may be uncovered, thereby permitting the arm 211 of the link to pass out of the slot.

Noting Fig. 5, it will be observed that an auxiliary guide 102 is supported by the base 1, and in this guide 102 and in the block 43 is mounted to slide, a lower rack bar which is shown in Fig. 24 and designated generally by the reference character 101. The forward end of the rack bar 101 is held for sliding movement (see Fig. 7) in an extension 28ᵃ, constituting a part of one of the guides 28. The lower rack bar 101 is equipped with a rack 103 which meshes into a pinion 104 secured to the bending and cutting shaft 55. The rack bar 101 is equipped upon its side face with a roller 105 adapted to ride in the cam slot 106 (see Fig. 26) formed in the side face of the disk 88. An upper rack bar 107 is mounted to slide upon the block 43 (see Fig. 5). A pin 108 inserted into the top of the block 43 is received in a longitudinal slot in the upper rack bar 107 and serves to guide the upper rack bar in its sliding movement. The rack bar 107 is equipped with a horizontal rack 109 which meshes into the pinion 51 which is secured to the primary bending shaft 48. The bar 107 is provided further with a vertical rack 110 which meshes into the top of the pinion 104 which is secured to the cutting and bending shaft 55. Journaled for rotation on top of the block 43 (see Fig. 6), is a roller 111 engaging one edge of the upper rack bar 107, whereby the same is maintained in mesh with the pinion 51. When the shaft 86 is rotated, rotary movement will be imparted to the disk 88, the cam slot 106 of which, engaging the roller 105, will impart longitudinal movement to the rack bar 101. When the lower back bar 101 is slid in the manner above described, the rack 103, meshing into the pinion 104, will rotate the cutting and bending shaft 55 in one direction, and when motion is thus imparted to the pinion 104, the same, meshing into the rack 110 of the upper rack bar 107, will impart sliding movement to the upper rack bar, the rack 109 of which, meshing into the pinion 51, will impart rotary movement to the primary bending shaft 48. It will thus be seen, that, by the mechanism above described, an oscillating, rotary movement is imparted to the primary bending shaft 48 and to the cutting and bending shaft 55.

Referring particularly to Figs. 3 and 29, it will be seen that a link 112 is pivotally connected with the crank arm 90, the rear end of the link 112 being pivotally connected with an upright lever 114, fulcrumed as indicated at 115 upon the base 1. Pivoted to the lever 114, and depressed by a spring 116ᵃ, is a short pawl 116. This pawl 116 engages with the links of the finished chain 13 to advance the chain with respect to the die 70 and the anvil 67, as hereinbefore described. Another, longer pawl 117 is pivoted to the lever 114, the longer pawl 117 being equipped at its rear end with a slotted head 118, the functions applicable to the pawl 117 and its head 118 being dealt with hereinafter.

It will be noted that when the crank arm 90 is operated through the medium of the shaft 86, motion will be transmitted to the link 112, thence to the lever 114, the short pawl 116 of which will engage with the completed chain of links, to advance the same with respect to the die and the anvil, as hereinbefore set forth.

Referring to Fig. 1, it will be seen that the shaft 86 is provided with a sprocket wheel 119 or like element, whereby rotary movement may be imparted to the shaft 86 from any suitable source of power. Secured to the drive shaft 86 is a sprocket wheel 120 about which is trained a sprocket chain 121, the chain being engaged about the sprocket wheel 9 which is carried by the shaft 7 of the tension mechanism. Thus, when the shaft 86 is rotated, motion will be transmitted to the shaft 7 and from the shaft 7 to the pinions 10 and 11 and to the coöperating rollers 15 and 14.

Passing now to a description of the assembling mechanism and particularly to Figs. 1, 30, 31, 32, 33 and 34, it will be observed that upon the sub-structure 1 is mounted a pair of bases 122, provided at their upper ends with bearings 123, in which shafts 124 are journaled for rotation, the shafts 124 being equipped with sprocket wheels 125 about which is trained a drive chain 126.

Referring to Fig. 30 it will be observed that one of the bearings 123 supports a bracket 127 upon which is pivoted a back stop pawl 128. This back stop pawl 128 engages the drive chain 126 and serves to prevent retrograde movement of the drive chain during the process of assembling the cross ties with the links, as will be set forth hereinafter. The shafts 124 may be maintained in parallelism by means of an alineing bar 129 within which the free ends of the shafts 124 are received.

Secured to the shafts 124 are rollers 130, the rollers 130 being circumscribed by grooves 131, the grooves 131 being cut into the rollers to such an extent, that, within the grooves 131, the rollers assume rectangular cross section, as shown at 132, Fig. 32. At spaced intervals, the grooves 131 are provided with enlargements 133. The chain of links, of the form shown in Fig. 19, after passing from between the anvil 67 and the die 70, is trained about the rollers 130, in the grooves 131, and at this point it may be noted that owing to the polygonal form of the rollers 130, within the grooves 131, as shown at 132, the several links will not be bent, when they are wrapped around the rollers 130. The enlargements 133 of the grooves 131 serve to receive the eyes 215 of the links. When the chain of links is passed around the rollers 130, the upper runs of the chain lie in parallelism, so that the completed fabric, as shown in Fig. 20, may consist of a plurality of longitudinal strands, each strand comprising a plurality of links.

The rollers 130 are provided with longitudinal grooves 134, communicating with the enlargements 133 of the grooves 131. The function of the longitudinal grooves 134 is to receive the cross ties 216 (see Figs. 18 and 20) which connect the longitudinal links hereinbefore described, and now designated by the reference character 217. Each cross tie 216 comprises converging arms 218, united at one end by a loop-shaped hook 220 and provided at their free ends with hooks 219. The means for fashioning the cross ties 216 will be dealt with hereinafter, but for the present it may be stated that the cross ties 216 are interlocked in their hooked portions 219 and 220 with the longitudinal links 217, between the eyes 215', as shown in Fig. 20. Through the medium of a mechanism shown in my copending application Serial No. 729,100, the cross ties 216 are assembled with the lines of longitudinal links 217, between the rollers 130, and when rotary movement is imparted to the rollers 130 through the engagement between the head 118 of the pawl 117 and the chain 126, the cross ties ultimately enter the longitudinal grooves 134 in the roller 130. When the cross ties 216 are thus positioned in the longitudinal grooves 134, the hooks 219 and 220 of the cross ties are clenched between the eyes 215' of the longitudinal links 217 by a mechanism which will now be described.

One of the rollers 130 is provided with a pinion 135 meshing into a pinion 136 journaled for rotation upon a support 137. Noting Fig. 33, it will be seen that the pinion 136 is provided with a plurality of guides 138 in which plungers 139 are mounted to slide, the outer ends of the plungers 139 being concaved as shown at 140 in Fig. 34. The inner ends of the plungers 139 carry rollers 141, movable in a cam slot 142 fashioned in a member 142ᵃ upheld by the support 137. When the shaft of the roller 130 which carries the plungers 139 is rotated, the plungers, one after another, will be advanced by their engagement with the cam member 142, the concaved ends 140 of the plungers entering the grooves 134 and serving to clench down the hooks of the cross ties 216 upon the longitudinal links 217, thereby to afford an inseparable pivotal union between the parts.

Passing now to a description of the mechanism whereby the cross ties 216 are formed and referring particularly to Figs. 35 and 36 in connection with Fig. 1, it will be observed that the base 1 supports an auxiliary reel 143 as before described, a tension device 144, a thimble 146, and an eye 147, of the sort hereinbefore described. The tension device 144 is operatively connected with the drive shaft 86 through the medium of a sprocket chain 145.

The machine for fashioning the cross ties 216 resembles in many particulars, the machine which is employed for fashioning the longitudinal links 217, and consequently, the description of the tie forming machine may be shortened accordingly. A pair of supports 148 is provided, the primary bending shaft being designated by the numeral 149, the shaft 149 corresponding to the shaft 48 shown in Fig. 27. The shaft 149 carries a pinion 150 and is journaled in a support 151 constructed as is the support 45. The closure plate is indicated at 152 and the numeral 153 indicates the main drive shaft, corresponding to the shaft 86. The shafts 153 and 86 are operatively connected by a sprocket chain 153$^a$. The eccentric upon the shaft 153 for operating the closure plate 152 is indicated by the reference character 154. The shaft 153 carries a crank arm 155 which is operatively connected with a pitman 156, the pitman 156 serving to actuate the cross head 157, the functions of the cross head 157 being the same as those of the cross head 35.

Journaled in the supports 148 are hollow shafts 158 and 159, the shaft 158 being provided with a transverse head 160 having a cutting and bending shoulder 161, reference being had, for comparison, to Fig. 15. The other shaft 159 is provided with a head 162 having a shoulder 163. Secured to the shaft 158 is a pinion 164 meshing into a pinion 165 secured to the shaft 159. An upper rack bar 166 is shown, the same having a horizontal rack 167 which meshes into the pinion 150 of the primary bending shaft 149. The upper rack bar 166 is also provided with a vertically disposed rack 168 which meshes into the pinion 164. A slidably mounted lower rack bar 169 is shown, the same meshing into the lower portion of the pinion 164, the rack bar 169 being operated from the cam slot 170 in the disk 171 which is secured to the shaft 153.

Mounted to reciprocate in the shafts 158 and 159 are slidable members 172 connected at one end by the transverse head 173 from which projects a finger 174 engageable by a cam 175 upon the disk 171. The slidable members 172 are thrust in one direction by springs 176, secured to one of the supports 148, the members 172 being slid in an opposite direction by the coöperation between the cam 175 and the finger 174. The slidable members 172 are connected by a collecting member 177, the same taking the form of a plate or bar. Located below the collecting member 177 is a fixed support 177$^a$.

The manner of feeding the stock to the machine depicted in Figs. 36 and 35, and the manner of bending the stock initially will be understood readily from what has been stated hereinbefore in connection with the machine whereby the longitudinal links are formed. However, it may be set forth that the shaft 149 operates like the shaft 48, to fashion the bend at one end of the cross tie, which is shown in Fig. 18.

When the shaft 153 is rotated, the cam slot 170 in the disk 171 will impart rotary movement to lower rack bar 169, the rack bar 169 actuating the pinion 164 and also actuating the upper rack bar 166, which, in its turn, will drive the primary bending shaft 149. When the pinion 164 is rotated, rotary movement will be imparted to the pinion 165, and both of the tubular shafts 158 and 159 will be rotated. The cutting and bending shoulder 161 of the head 160 upon the end of the shaft 158 will cut the material to a predetermined length and fashion the hooks 219, the shoulder 163 on the head 162 of the shaft 159 turning over the looped end of the cross tie, to form the hook 220. During this operation, the support 177$^a$ will serve to uphold the cross tie, and the completed cross ties will be received by the reciprocating collecting member 177, to which oscillatory motion is transmitted through the slidable members 172, the head 173, the finger 174, and the cam 175 of the disk 171. The completed cross ties 216 will assemble on the collecting member 177 and from the collecting member 177, the cross ties are removed, in any suitable manner and are interengaged with the lines of links upon the assembling rollers 130.

Referring to Figs. 37 and 38, there is shown modified means for actuating portions of the structure, the disk 188 being dispensed with. In Figs. 37 and 38 there is shown a bed or base 178, carrying supports 179, in which the drive shaft 180 is journaled. The drive shaft 180 is equipped with the crank arm 181, which engages the pitman 182, the same being operatively connected with the cross head 183. The primary bending shaft is indicated at 184, this element corresponding to the shaft 48 hereinbefore described, the shaft 184 being provided with a pinion 185. The transverse, horizontally disposed cutting and bending shaft is indicated at 186 and carries the pinion 187.

Projecting laterally from one side of the structure, adjacent the forward end thereof, is the pin 188, received within slots 189 formed longitudinally in bars 190 and 191.

The bar 190 is provided with an upright extension carrying the rack 192 which meshes into the pinion 185, the bar 190 carrying also the rack 193 which meshes into the pinion 187. The bar 191 is provided with the rack 194 which meshes into the bottom of the pinion 187. The lever 195 is fulcrumed at 196 intermediate its ends upon one side of the bar 191, one end 197 of the lever 195 being movable into and out of the path of the cross head 183. To the other end of the bar 191 is pivoted the link 198, pivoted to a link 199, which in its turn, is pivotally connected adjacent its upper end with a bracket 200 supported by the base 178. Upon the bar 190 there is a lug 201 which is adapted to be engaged by the cross head 183.

When the cross head 183 moves in the direction of the arrow X in Fig. 38, the cross head is engaged with the end 197 of the lever 195, motion being thereby transmitted to the bar 191. When the lever 195 and the bar 191 are thus moved longitudinally of the machine, the links 198 and 199 will hinge upon each other until the end of the link 199 ultimately comes in contact with the base or support 178. Thereupon, the lever 195 will be tilted upon its fulcrum 196, the end 197 of the lever being withdrawn out of the path of the cross head 183. Subsequently, the cross head 183 will engage with the lug 201 on the rod 190. It will therefore be seen that when the cross head 183 moves in the direction of the arrow X, the rods or bars 190 and 191 will be slid in the direction of the arrow, alternately, the bars, through the medium of their respective racks, serving to impart oscillatory rotation to the primary bending shaft 184 and to the cutting and bending shaft 186.

In order to remove some of the strain from the bars 190 and 191 and their associated racks during the cutting and bending operation, the cam 203 is fixed on the drive shaft 180, and when the cutting and bending shaft 186 is rotated, an arm 204 which is secured to the shaft 186 is swung into engagement with the cam 203, whereupon, at the appropriate time, motion will be transmitted to the shaft 186, to rotate the same and to aid in consummating the cutting and bending operation.

The slidably mounted member 202, corresponding to the member 60 in Fig. 15, is provided at one end with a roller 206, and is actuated in one direction by a spring 208. Supported for swinging movement upon one of the members 179 is a cam 205, one end of which is held in the path of the arm 204 by a spring 207. When the shaft 186 is rotated, thereby swinging the arm 204, the arm 204 will engage the cam 205 and impart swinging movement to the cam, the outer edge thereof engaging the roller 206 and retracting the slidably mounted member, so that its end no longer protrudes beyond the end of the shaft 186 (note the corresponding part 61 in Fig. 15).

After a length of fabric has been completed by connecting the cross ties with the lines of links upon the assembling rollers, it is desirable to actuate the link-forming mechanism for a time independently of the tie-forming mechanism, so that another set of link-chains may be engaged about the assembling rollers. In order to render the tie-forming mechanism inoperative when desired, a clutch 250 may be interposed in the shaft 86.

Having thus described the invention, what is claimed as new is:

1. In a device of the class described, tension mechanism including a frame; shafts journaled in the frame, one shaft being yieldably supported; means for operatively connecting the shafts; wire engaging rollers upon the shafts; and a projection outstanding from one roller and adapted to engage the other roller to space the rollers apart.

2. In a device of the class described, tension mechanism including a frame; rotatable wire engaging members journaled in the frame, one rotatable member being yieldably supported and one rotatable member having a projection adapted to engage the other rotatable member to space the rotatable members apart; and means for rotating the rotatable members.

3. In a device of the class described, tension mechanism including a frame; a wire holder rigidly mounted with respect to the frame; coöperating rotatable wire engaging members journaled in the frame and constituting means for advancing a wire with respect to the wire holder, one rotatable member being yieldably supported and one rotatable member having a projection adapted to engage the other rotatable member to space the rotatable members apart and to afford an intermittent feed with respect to the wire holder.

4. In a device of the class described, means for advancing the material; means for bending the end of the material upon itself and into approximate parallelism with the line of advance of the material to form a loop; means for turning the bend of the loop into a hook; means for severing the loop; and means for turning the ends of the loop to form hooks.

5. In a device of the class described, a slidably mounted cross-head; means for reciprocating the cross-head; a grip movably mounted upon the cross-head; a member located in the path of the grip and coöperating with the grip to cause the same to engage the material when the cross-head is moved;

mechanism for severing a section from the material; and mechanism for shaping the severed section.

6. In a device of the class described, a relatively fixed support; a rotatable member upon the support; means for fashioning the material into a loop and for feeding the loop upon the rotatable member; means carried by the rotatable member for forcing the sides of the loop together; means carried by the rotatable member for severing the loop; and means carried by the rotatable member for forming a hook in the loop.

7. In a device of the class described, supports; rotary bending members having projections movable around the supports to effect a bending of both ends of the material, one of the bending members having means for forcing the side portions of the material together.

8. In a device of the class described, supports; rotary bending members, the bending members having projections movable around the supports to effect a bending of both ends of the material, one of the bending members being provided with means for forcing the side portions of the material together and being provided with cutting means.

9. In a device of the class described, link-shaping means comprising an anvil and a movable die coöperating therewith; means for operating the die; and spaced link-engaging elements located upon opposite sides of the anvil and constituting means for holding a link upon the anvil when the die is moved away from the anvil by the die-operating means.

10. In a device of the class described, a bending member operating in one plane and adapted to form a loop in the material; and a pair of bending members operating in a different plane and adapted to shape hooks at the ends of the loop, one of the last specified bending members being provided with means for severing the loop.

11. In a device of the class described, a bending member operating in one plane and adapted to form a loop in the material; and a pair of bending members operating in a different plane and adapted to form hooks at the ends of the loop, one of the last specified bending members having means for severing the loop and being provided with means for forcing the sides of the loop together.

12. In a device of the class described, shafts journaled for rotation in a common plane; a shaft journaled for rotation in a different plane; bending members upon the shafts; pinions upon the last specified shaft and upon one of the first specified shafts; means for operatively connecting the first specified shafts; and a rack bar meshing into the pinions.

13. In a device of the class described, link-shaping means comprising an anvil and a movable die coöperating therewith; means for operating the die; and yieldable link-engaging means operating adjacent the anvil and adapted to hold the link on the anvil when the die is moved away from the anvil by the die-operating means.

14. In a device of the class described, means for advancing the material by successive steps; means for bending the end of the material upon itself and into approximate parallelism with the line of advance of the material between said steps to form a loop; a movable member acting as a guide for the material during both of said steps; and means for retracting the movable member between the said steps to permit the formation of the loop.

15. In a device of the class described, a slidably mounted cross head; means for reciprocating the cross head; a grip movably mounted upon the cross head; a member located in the path of the grip and coöperating with the grip to cause the same to engage the material when the cross head is moved; and mechanism for shaping the material.

16. In a device of the class described, a slidably mounted cross head; means for reciprocating the cross head; a grip movably mounted upon the cross head; a member located in the path of the grip and coöperating with the grip to cause the same to engage the material when the cross head is moved; and mechanism for severing a section from the material.

17. In a device of the class described, a slidably mounted cross head; a movable member upon the cross head and adapted to bind the material upon the cross head; a pivotally mounted trip; a projection upon the movable member and adapted to engage the trip, the projection being mounted to move upon the movable member; means for holding the projection in adjusted positions along the movable member; and means for operating upon the material after the same has been moved by the cross head.

18. In a device of the class described, link-shaping means comprising an anvil and a movable die coöperating therewith; means for operating the die; levers fulcrumed adjacent the anvil; yieldable means for controlling the movement of the levers; and link-engaging elements carried by the levers and located upon opposite sides of the anvil, said elements constituting means for holding a link upon the anvil when the die is actuated by the die-operating means.

19. In a device of the class described, a relatively fixed support; a rotatable member upon the support; means for fashioning the material into a loop and for feeding the loop upon the rotatable member; and means carried by the rotatable member for forcing the sides of the loop together.

20. In a device of the class described, a relatively fixed support; a rotatable member upon the support; means for fashioning the material into a loop and for feeding the loop upon the rotatable member; means carried by the rotatable member for forcing the sides of the loop together; and means carried by the rotatable member for severing the loop.

21. In a device of the class described, a relatively fixed support; a rotatable member upon the support; means for fashioning the material upon a loop and for feeding the loop upon the rotatable member; means carried by the rotatable member for forcing the sides of the loop together; and means carried by the rotatable member for forming a hook in the loop.

22. In a device of the class described, a rotatable member having means for bending the material upon itself to form a loop; a rotatable member having means for cutting the loop to a predetermined length and for bending the loop into hook shape at one end; and a reciprocating element having converging parts for closing the sides of the loop together.

23. In a device of the class described, means for bending the material into a loop; a rotatable bending member having means for severing the loop; means carried by the bending member for forming a hook in the loop; means carried by the bending member for initially closing the sides of the loop together; and means independent of the bending member for finally closing the sides of the loop together.

24. In a device of the class described, a rotatable bending member having means for bending the material upon itself to form a loop; a rotatable bending member having means for cutting the loop to a predetermined length and for bending a hook into the loop, the last specified bending member having means for initially closing the sides of the loop together; and a reciprocating element having converging parts for finally closing the sides of the loop together.

25. In a device of the class described, means for bending the material upon itself to form a loop; means for cutting the loop to a predetermined length; and a reciprocating element having converging parts for closing the sides of the loop together, said element having a prong for distending the loop.

26. In a device of the class described, means for bending the material upon itself to form a loop; means for cutting the loop to a predetermined length; means for initially closing the sides of the loop together; and a single means for finally closing the sides of the loop together and for distending the loop.

27. In a device of the class described, a rotatable member having means for bending the material upon itself to form a loop; a rotatable member having means for cutting the loop to a predetermined length, said member being provided with means for initially closing the sides of the loop together; and a reciprocating element having converging parts for finally closing the sides of the loop together, said element having a prong for distending the loop.

28. In a device of the class described, means for bending the material upon itself to form a loop; a rotatable member; a fulcrum slidable in the rotatable member; means upon the rotatable member for bending the material across the fulcrum and for closing the sides of the loop together initially; means for advancing and retracting the fulcrum; and independent means for finally closing the sides of the loop together.

29. In a device of the class described, means for bending the material into a loop; a rotatable member; a fulcrum slidable in the rotatable member; means upon the rotatable member for bending the material across the fulcrum and for initially closing the sides of the loop; means for advancing and retracting the fulcrum; and independent means for finally closing the sides of the loop together, said independent means including an element for distending a portion of the loop.

30. In a device of the class described, a primary shaft having means for bending the material upon itself to form a loop; a secondary shaft having means for severing the loop and for fashioning engaging elements at the free ends of the loop; a pinion upon the primary shaft; a pinion upon the secondary shaft; a rack-bar meshing into the pinion of the primary shaft and into one side of the pinion of the secondary shaft; a rack-bar meshing into the other side of the pinion of the secondary shaft; an anti-friction element on the last specified rack-bar; a disk having a cam groove in which the anti-friction element travels; a shaft on which the disk is mounted; and means operable by the disk shaft for feeding the material.

31. In a device of the class described, means for concatenating links into a chain; spaced, approximately parallel members around which the chain is wound in spaced convolutions, one member being rotatable; means for driving the rotatable member; and a cross tie clencher operating transversely of one of said parallel members and coöperating directly therewith.

32. In a device of the class described, chain forming means; spaced members around which the chain is trained, one of said members being rotatable; means for driving the rotatable member; a movable actuating member; and elements upon the actuating member, one of which elements constitutes means for actuating the chain, the other of which elements constitutes a part of the driving means.

33. In a device of the class described, chain forming means; spaced, separate members around which the chain is trained, one of said members being rotatable; means for driving the rotatable member; a lever fulcrumed for swinging movement; and pawls upon the lever, one of which pawls engages the chain, the other of which pawls constitutes a part of the driving means.

34. In a device of the class described, a rotatable member having means for bending the material upon itself to form a loop; and a rotatable member having means for cutting the loop to a predetermined length and for bending the free ends of the loop into hooks.

35. In a device of the class described, a rotatable member having means for bending the material upon itself to form a loop; a rotatable member having means for cutting the loop to a predetermined length and for bending the free ends of the loop into hooks; and a reciprocating element having converging parts for closing the sides of the loop together.

36. In a device of the class described, a rotatable member having means for bending the material upon itself to form a loop; a rotatable member having means for cutting the loop to a predetermined length and for bending the free ends of the loop; and a reciprocating element having converging parts for closing the sides of the loop together, said element having a prong for distending the loop.

37. In a device of the class described, a rotatable member; a fulcrum slidable therein; means upon the rotatable member for bending the material over the fulcrum; and means for retracting and advancing the fulcrum.

38. In a device of the class described, a rotatable member; a fulcrum slidable therein; means upon the rotatable member for cutting the material to a predetermined length and for bending the material over the fulcrum; and means for retracting and advancing the fulcrum.

39. In a device of the class described, a rotatable element having means for bending the material upon itself to form a loop; a rotatable member; a fulcrum slidable in the rotatable member; means upon the rotatable member for bending the material across the fulcrum; and means for retracting and advancing the fulcrum.

40. In a device of the class described, a rotatable element having means for bending the material upon itself to form a loop; a rotatable member; a fulcrum slidable in the rotatable member; means upon the rotatable member for cutting the material to a predetermined length and for bending the material across the fulcrum; and means for retracting and advancing the fulcrum.

41. In a device of the class described, a rotatable element having means for bending the material upon itself to form a loop; a rotatable member; a fulcrum slidable in the rotatable member; means upon the rotatable member for bending the material across the fulcrum; means for advancing and retracting the fulcrum; and a reciprocating element having converging parts for closing together the sides of the loop which is formed when the material is bent upon itself.

42. In a device of the class described, a rotatable element having means for bending the material upon itself to form a loop; a rotatable member; a fulcrum slidable in the rotatable member; means upon the rotatable member for bending the material across the fulcrum; means for advancing and retracting the fulcrum; and a reciprocating element having converging parts for closing the sides of the loop together, said element comprising a prong for distending the loop.

43. In a device of the class described, a rotatable element having means for bending the material upon itself to form a loop; a rotatable member; a fulcrum slidable in the rotatable member; means upon the rotatable member for cutting the material to a predetermined length and for bending the material across the fulcrum; and a reciprocating element having converging parts for closing the sides of the loop together.

44. In a device of the class described, a rotatable element having means for bending the material upon itself to form a loop; a rotatable member; a fulcrum slidable in the rotatable member; means upon the rotatable member for cutting the material to a predetermined length and for bending the material across the fulcrum; and a reciprocating element having converging parts for closing the sides of the loop together, said element comprising a prong for distending the loop.

45. In a device of the class described, a rotatable member having a slot and provided with a projection extended across the slot; means for feeding the material into the slot; means for rotating the member, whereby the projection will double the material to form a loop; means for severing the material; and means for fashioning engaging elements in the free ends of the loop.

46. In a device of the class described, a rotatable member having an opening through which the material is threaded; means for rotating the member to double the material into a loop; means for cutting the loop to a predetermined length; and means for fashioning engaging elements at the free ends of the loop.

47. In a device of the class described, a rotatable member having an opening through which the material is threaded; means for rotating the member to fold the material into a loop; and a rotatable member having an eccentric portion for cutting the loop to a predetermined length, and for bending the ends of the loop; and a fulcrum upon the last specified rotatable member, over which the material is bent.

48. In a device of the class described, a rotatable member having an opening through which the material is threaded; means for rotating the member to double the material into a loop; a rotatable member having an eccentric portion for cutting the loop to a predetermined length and for bending the free ends of the loop to form engaging elements therein; a shiftable fulcrum upon the last specified rotatable member, over which the material is bent to form the engaging elements; and means for advancing and retracting the fulcrum.

49. In a device of the class described, a rotatable member having means for bending the material upon itself to form a loop; a rotatable member having means for cutting the loop to a predetermined length and for fashioning the free ends of the loop into hooks; means for holding the loop after the formation of the hooks; means for advancing another loop before the same is cut; and an inclined element along which the last specified loop slides, to elevate the bend thereof for engagement with the hooks of the loop which is held.

50. In a device of the class described, a rotatable member having means for bending the material upon itself to form a loop; a rotatable member having means for cutting the loop to a predetermined length and for fashioning the free ends of the loop into hooks; a movable, loop-shaping die and a coöperating anvil, constituting means for holding the loop after the formation of the hooks therein; means for advancing another loop before the same is cut; and an inclined element along which the last specified loop slides to elevate the bend thereof for engagement with the hooks of the loop which is held.

51. In a device of the class described, a support having an opening; a member rotatable in the support and provided with an aperture; means for feeding the material through the aperture; a movable closure for the opening; means for retracting and advancing the closure from the opening; means for rotating the member to swing one end of the material out of the opening to form a loop; means for severing the loop; and means for forming engaging elements at the free ends of the loop.

52. In a device of the class described, a link forming means; means for concatenating the links to form a chain; spaced distinct members around which the chain is wound in transversely spaced parts to receive cross ties, one member being rotatable; and a movable member operable by the rotatable member and coacting directly therewith for closing the ties upon the links.

53. In a device of the class described, link forming means; means for concatenating the links to form a chain; spaced rotatable members around which the chain is wound in spaced parts to receive cross ties; a slidable plunger; means for operating the plunger from one of the rotatable members; and a fixed cam member with which the plunger is engaged, the plunger constituting means for closing the ties upon the links.

54. In a device of the class described, link-forming means; means for concatenating the links to form a chain; spaced members about which the chain is trained in a continuous length, one of said members being rotatable; a device for rotating the rotatable member; a chain-engaging element movable transversely of the axis of the rotatable member and coöperating with said device in the rotation of the rotatable member; and means for actuating both the chain-engaging element and said device.

55. In a device of the class described, link forming means, means for concatenating the links to form a chain; spaced rotatable members around which the chain is trained; a device for operatively connecting the rotatable members; a movable member; and elements upon the movable member, one of which elements constitutes means for actuating the chain, the other of which elements constitutes means for actuating said device.

56. In a device of the class described, link forming means; means for concatenating the links to form a chain; spaced rotatable members around which the chain is trained; a device for operatively connecting the rotatable members; a lever fulcrumed for swinging movement; and pawls upon the lever, one of which engages the device, and the other of which engages the chain.

57. In a device of the class described, link forming means; means for concatenating the links to form a chain; spaced rotatable members around which the chain is wound; a drive chain; a back stop pawl engaging the drive chain to prevent movement of the drive chain in one direction; and means engaging the drive chain to advance the same in an opposite direction.

58. In a device of the class described, link forming means; means for concatenating the links to form a chain; spaced rotatable members around which the chain is wound; a drive chain; a back stop pawl engaging the drive chain to prevent movement of the drive chain in one direction; a lever fulcrumed for swinging movement; and a pawl upon the lever engaging the drive chain to actuate the same in an opposite direction.

59. In a device of the class described, link forming means; means for concatenating the links to form a chain; a rotatable member having intersecting circumscribing transverse grooves, the circumscribing grooves being adapted to receive the chain; intermeshing pinions, one of which is carried by the rotatable member; a plunger slidable upon the other pinion and separating at the intersection of the intersecting grooves, to constitute clenching means; and a fixed cam with which the plunger is engaged.

60. In a device of the class described, a primary shaft having means for bending the material upon itself to form a loop; a secondary shaft having means for severing the loop; and means for operatively connecting the shafts.

61. In a device of the class described, a primary shaft having means for bending the material upon itself to form a loop; a secondary shaft having means for severing the loop and for forming engaging elements at the free ends of the loop; and means for operatively connecting the shafts.

62. In a device of the class described, a primary shaft having means for bending the material upon itself to form a loop; a secondary shaft having means for bending the ends of the loop to form engaging elements; and means for operatively connecting the shafts.

63. In a device of the class described, a primary shaft having means for bending the material upon itself to form a loop; a secondary shaft having means for severing the loop and for fashioning engaging elements at the free ends of the loop; a pinion upon the primary shaft; a pinion upon the secondary shaft; a rack-bar meshing into the pinion of the primary shaft and into one side of the pinion of the secondary shaft; a rack-bar meshing into the other side of the pinion of the secondary shaft; and means for actuating the last-named rack-bar.

64. In a device of the class described, a supporting structure; guides thereon, a cross head slidable upon the guides; a drive shaft journaled in the supporting structure; means for operatively connecting the drive shaft and the cross head; means upon the cross head for engaging the material to advance the same; and mechanism actuated from the drive shaft for cutting the material into lengths and for fashioning the lengths into links.

65. In a device of the class described, a supporting structure; guides thereon; a cross head slidable upon the guides; a member mounted to move upon the cross head; a pivoted trip carried by the supporting structure and adapted to engage the movable member to cause the same to engage with the material; means for actuating the cross head to advance the material; a device for severing the material into lengths; and means for fashioning the lengths into links.

66. In a device of the class described, a supporting structure; tubular shafts journaled therein; a combined cutting and bending member upon one shaft; a bending member upon the other shaft; means for operatively connecting the shafts; a delivery member slidable in the shafts; and means for operating the delivery member.

67. In a device of the class described, tension mechanism including a frame; shafts journaled in the frame, one shaft being yieldably supported; pinions upon the shafts; wire engaging rollers upon the shafts; and a projection outstanding from the periphery of one roller and adapted to engage the other roller to space the rollers apart.

68. In a device of the class described, means for fashioning inter-engaging elements upon the links; means for bringing the inter-engaging elements into inter-locking relation with each other; coöperating members including a die and an anvil coöperating to shape the links as one step; said members having coöperating parts for completing the inter-locking of the inter-engaging elements of the links as a second step.

69. In a device of the class described, coöperating parts comprising a die and an anvil, one of which parts is provided with link shaping means, and the other one of said parts having an element for clenching a pair of complete links together.

70. In a device of the class described, link forming means, means for concatenating the links to form a chain; spaced separate elements about which the chain is engaged and between which the chain is free; cross tie forming mechanism; and means for advancing the cross ties out of the tie forming mechanism and toward the free portions of the chain of links between the spaced elements.

71. In a device of the class described, link forming means; means for concatenating the links to form a chain; spaced separated elements about which the chain is engaged and between which the chain is free; cross tie forming mechanism; means for advancing the cross ties out of the tie forming mechanism and toward the free portions of the chain of links between the spaced elements, and mechanism coöperating with one of said spaced members for clenching the cross ties upon the chain of links.

72. In a device of the class described, a pair of assembling rollers; means for fashioning a fabric on the assembling rollers; and means for actuating the rollers and the fabric to cause the fabric to pass off the assembling rollers.

73. In a device of the class described, a fixed member and a movable member having coöperating eye forming elements and provided with means for holding the material against lateral spreading beyond the eye forming elements.

In testimony that I claim the foregoing as my own, I have hereto affixed my signature in the presence of two witnesses.

GARY B. SMITH.

Witnesses:
SELINA WILLSON,
MASON B. LAWTON.

---

Copies of this patent may be obtained for five cents each, by addressing the "Commissioner of Patents, Washington, D. C."